Aug. 13, 1957    C. P. VAN DIJK ET AL    2,802,861
PREPARATION OF DIESTERS OF TEREPHTHALIC ACID
Filed May 23, 1955
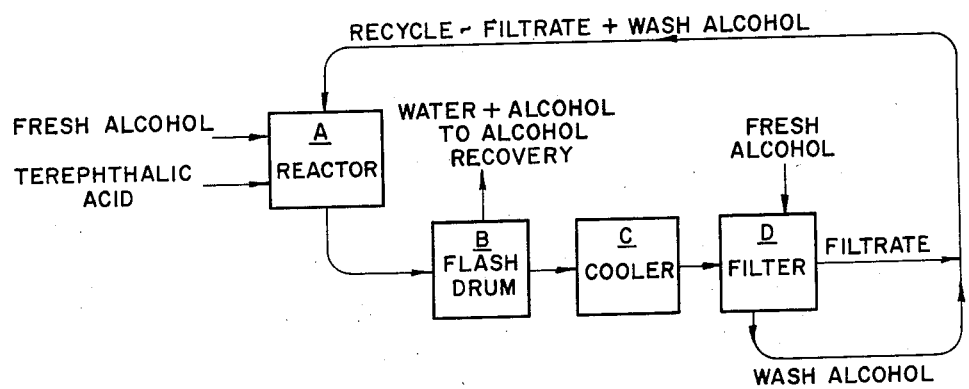
FIG. I
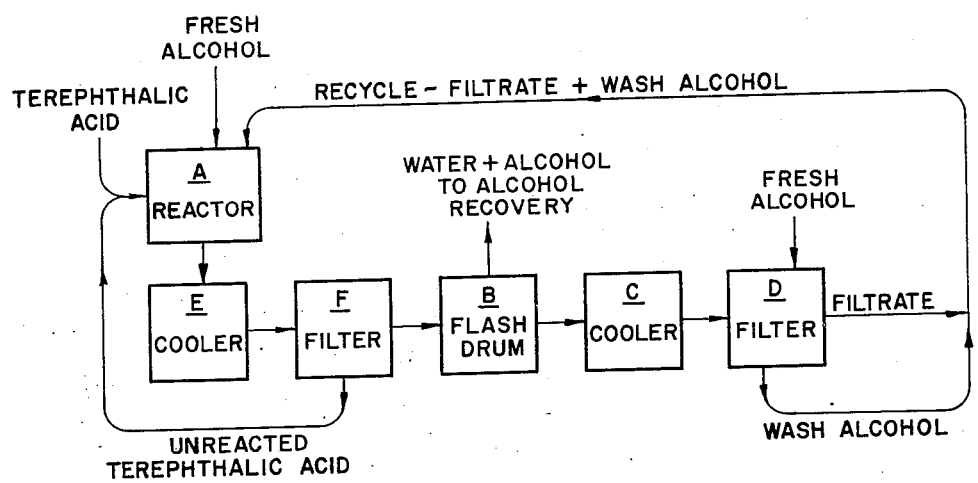
FIG. II
INVENTORS
CHRISTIAAN PIETER VAN DIJK
NICOLAAS MAX
JACOBUS BASTIAAN DE JONGE
BY
THEIR AGENT

United States Patent Office 2,802,861
Patented Aug. 13, 1957

2,802,861

PREPARATION OF DIESTERS OF TEREPHTHALIC ACID

Christiaan Pieter van Dijk, Nicolaas Max, and Jacobus Bastiaan de Jonge, Amsterdam, Netherlands, assignors to Shell Development Company, New York, N. Y., a corporation of Delaware Application May 23, 1955, Serial No. 510,346

Claims priority, application Netherlands July 13, 1954

7 Claims. (Cl. 260—475)

This invention relates to a process for the preparation of diesters of terephthalic acid. More particularly, the invention relates to a non-catalytic process for preparing diesters of terephtalic acid with lower aliphatic alcohols.

Recent developments in the field of synthetic fibers have markedly increased the interest in various organic acids and esters thereof. Of particular interest has been the dimethyl ester of terephthalic acid, for the condensation product of dimethyl terephthalate with ethylene glycol constitutes one of the most promising of the synthetic fibres, Dacron. There is, therefore, a great deal of interest in methods for producing the diesters of terephthalic acid.

Diesters of terephthalic acid with lower aliphatic alcohols have heretofore been prepared by reacting the acid with an alcohol in the presence of sulfuric acid as catalyst. Such a process has serious disadvantages, commercially, for the catalyst is extremely corrosive, tends to promote the formation of ethers from the alcohol and also reacts to a substantial extent with the alcohol to form valueless sulfates. Further, the diester produced by the process is contaminated with side reaction products which adversely affect the color characteristics of its ethylene glycol condensation product. These side reaction products are removed only with great difficulty, and thus contribute substantially to the cost of the commercial diester. It is therefore highly desirable that a process which does not produce such contaminants be developed; a non-catalytic process would be preferred, since elimination of the catalyst would reduce the number of materials to be handled in the process, and simplify purification of the product.

It is well known that monoesters of terephthalic acid with lower alkanols may be prepared by heating the terephthalic acid with a large excess of the lower alkanol, no catalyst being present. (See, for example, U. S. Patent No. 2,479,066.) It is also known that isophthalic acid may be completely esterified under similar conditions (see U. S. Patent No. 2,569,440.) However, it has heretofore been considered impossible to prepare the diester of terephthalic acid without a catalyst. For example, U. S. Patent No. 2,479,066, referred to above, discloses (Example 2 thereof) that the mono-n-butyl ester of terephthalic acid is prepared by heating the acid with a large excess of n-butyl alcohol at a temperature of about 300° C. and a pressure of about 250–280 atmospheres; the yield of diester is stated to be quite small. In the penultimate paragraph of column 3 of the patent, the patentee suggests that the diester be prepared by catalytic esterification of the monoester, thus confirming the result of the working example that under the conditions therein disclosed, non-catalytic esterification of the acid to the diester was not feasible.

This finding was again affirmed in the later work reported in U. S. Patent No. 2,569,440, for according to this patent (column 1, lines 37–39) isophthalic acid can be completely esterified non-catalytically, but terephthalic acid cannot. In fact, the patentees use this difference in reactivity of isophthalic and terephthalic acids as the basis for a method for separating isophthalic acid from mixtures of the two acids. The art thus clearly is to the effect that non-catalytic esterification of terephthalic acid is limited to the production of the monoester.

In direct contradiction to these teachings of the art, applicants have discovered that terephthalic acid can be noncatalytically esterified quantitatively, the product being the diester to the almost complete exclusion of the monoester, by mixing the acid with the lower alkanol in certain critical proportions, and heating the resulting mixture within certain conditions of temperature and pressure. According to their discovery, more than 95% of the terephthalic acid is esterified, more than 90% of the product being the diester, by mixing the lower alkanol and the terephthalic acid in the ratio of at least 25 moles of alkanol per mole of acid, heating this mixture to a temperature of at least 150° C., the pressure being such that the alcohol is maintained in the liquid phase, and maintaining these conditions until substantially all of the acid has been converted to the dialkyl terephthalate.

Applicants have thus discovered a process which produces virtually quantitative conversion of terephthalic acid to the alkyl diester thereof. Applicants have also discovered that the process results in a pure, easily separated product, for it has been found that at a room temperature the dialkyl ester is much less soluble in the reaction mixture than is the monoalkyl ester, so that the product is easily obtained in a pure form merely by cooling and filtering the reaction mixture, and washing the solid product with a small amount of fresh alkanol. The alkanol used for washing the product may then be used in a further operation of the process; likewise, the filtrate, containing the small amount of monoester formed and the unreacted alkanol, may be used in the preparation of additional amounts of diester. The product dialkyl terephthalate has been found to be substantially free of difficultly separable contaminants, and is suitable for use in the preparation of synthetic fibres with but a minimum of additional purification.

The process of the invention is illustrated by accompanying Figures I and II which form a part of this specification. These figures represent two aspects of a cyclic process provided by the invention.

The process of the invention is useful in the preparation of esters of terephthalic acid with lower alkanols. By the term "lower alkanols" is meant any alkanol, that is to say, any aliphatic monohydric alcohol having from 1 to about 4 carbon atoms. While both straight-chain and branched chain alkanols may be used, it is preferred that the alkanol reactant be a straight-chain alkanol. Methanol is an especially preferred reactant, since dimethyl terephthalate can be used directly in the preparation of synthetic polyesters for fibre production.

It is essential to the complete esterification of the terephthalic acid that there be present in the reaction mixture at least 25 moles of the lower alkanol per mole of the terephthalic acid, and preferably that the molar ratio of alcohol to acid be at least 30 to 1. It has been found that maximum conversion of terephthalic acid to the diester occurs when the molar ratio of alcohol to acid amounts to about 40 to 1, and that little or no added conversion results when the ratio exceeds about 40 to 1. It is therefore preferred that the alcohol to acid molar ratio lie at about 40 to 1—i. e., from about 30 to 1 to about 50 to 1.

The esterification may be carried out at any temperature in excess of about 150° C. The reaction temperature should not substantially exceed about 300° C., however, since at higher temperatures, terephthalic acid tends to decompose. It is preferred that the reaction be conducted at a temperature of from about 180° C. to about 260° C. During the reaction, the alcohol must remain in the liquid phase; accordingly, superatmospheric pressures are required. The pressure on the system should be at least about 20 atmospheres, the maximum pressure used being governed by the nature of the process equipment available. Pressures within the range of from about 30 to about 200 atmospheres are preferred.

The time required for completion of the reaction depends primarily upon the temperature of the reaction mixture. For example, when the reaction is carried out at about 200° C., a minimum reaction time of about 5 hours is required; where the temperature is about 250° C., however, the reaction goes to substantial completion in about ½ hour. Where lower temperatures are used, the reaction time is accordingly longer—up to 20 hours or more.

The esterification of terephthalic acid by an alkanol necessarily produces water, i. e.—

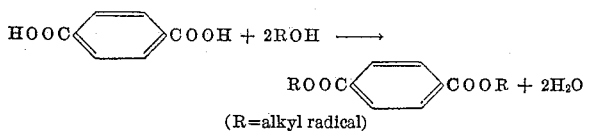

(R=alkyl radical)

It would be expected that the presence of water in the reaction mixture would tend to force the reaction to the left, reducing the amount of terephthalic acid esterified. However, it has been found, surprisingly, that under the reaction conditions a substantial amount of water can be present in the reaction zone without causing serious reduction in the yield of diester. For example, it has been found that where the reaction mixture contained as much as 22% by weight of water, the terephthalic acid was 68% converted into diester. The maximum water content, for practical operation of the process, thus appears to be about 30% by weight of the reaction mixture. It is preferred that somewhat less water—not over about 10–15% by weight of the mixture—be present.

It will be seen from the preceding discussion that the process of the invention is easily performed in a cyclic, and preferably continuous, manner, for the product is easily separated from the reaction mixture and the remaining components of said mixture may be directly recycled to produce further diester product; there is virtually no conversion of the terephthalic acid into by-products which cannot be used to produce further diester. The by-product water is easily removed by distillation to keep the amount of water within the permissible limits.

For example, the process of the invention can be carried out in a continuous manner similar to those aspects of the invention embodied in Figures I and II. These embodiments of the process of the invention exploit several of the advantages inherent in the new process. According to Figure I, terephthalic acid and fresh alcohol are fed to reactor A. Following completion of the reaction, the reaction mixture is passed to the flash drum B, wherein the pressure is reduced to allow flashing of sufficient alcohol and water to remove the desired amount of water. The water and alcohol so removed may be processed for recovery of the alcohol. The remainder of the reaction mixture is passed to the cooler C wherein the mixture is cooled to about 65° C. or lower. The cooled mixture is passed to the filter D, wherein the solid dialkyl terephthalate is removed. The filtrate, consisting primarily of water, unreacted alcohol, monoalkyl terephthalate and unreacted terephthalic acid, is recycled to the reactor A. The product is washed with fresh alcohol and the washings added to the recycled material.

The embodiment of the new process shown in Figure II is used when, for some reason, it is desirable that the esterification of terephthalic acid not be carried to the quantitative levels possible with the new process. In such a case, it has been found that the unreacted terephthalic acid is relatively insoluble in the reaction mixture and tends to pass from the system with the diester. While separation of the acid from the diester is easily accomplished due to the difference in melting point (terephthalic acid tends to decompose but not melt at about 300° C. or above while, for example, dimethyl terephthalate melts at about 140° C.) it is often more convenient to remove the terephthalic acid from the reaction mixture itself. It has been found that, in many cases, the terephthalic is insoluble in the reaction mixture at the reaction conditions and may simply be removed by filtration or centrifugation of the reaction mixture; however, when the acid is soluble in the reaction mixture at the reaction conditions, even moderate cooling—to perhaps about 125–135° C.—will cause the acid to precipitate from the solution. The solution should be cooled only as is necessary to cause substantially complete precipitation of the terephthalic acid, and should not be carried to the point where the diester begins to precipitate. In general, it will not be necessary to cool the solution below about 100° C. At these temperatures, the diester has been found to be quite soluble in the reaction mixture so that removal of the acid is easily effected. It has been found that further cooling causes precipitation of the diester, allowing recovery of the diester by filtration, centrifugation, or by other techniques known to the art for removing a solid from a liquid. The solution should be cooled only as is necessary to cause substantially quantitative precipitation of the diester. In general, cooling to a temperature of about 65° C. has been found to allow recovery of substantially all of the diester, and cooling below room temperature is seldom either necessary or desirable. This two-stage cooling-filtration system has been incorporated in the process shown in Figure II, wherein removal of the unreacted terephthalic acid is effected by pre-cooling acid filtering the reaction mixture in cooler E and filter F. The terephthalic acid so recovered is recycled to reactor A. It is not necessary that the terephthalic acid be washed, for the adhering mother liquor is preferably also recycled. In fact, it may be convenient and desirable in many cases that the pre-cooled reaction mixture be passed through a settler, such as a hydrocyclone, and the acid removed and recycled to the reactor in the form of a fluid slurry—which may be more easily handled than the solid filter cake.

The water content of the reaction mixture is controlled by removing a portion of the recycled product-free reaction mixture or by distilling the reaction mixture either before or after the product is removed. The water is most conveniently removed as shown in Figures I and II—i. e., the pressure in the hot reaction mixture leaving the reactor is reduced, allowing sufficient distillation of the alcohol and water to reduce the water content of the reaction mixture to the desired level. This technique takes advantage of the fact that the distillation serves to reduce the temperature of the reaction mixture—reducing the amount of cooling required to cool the reaction mixture to the temperature necessary to precipitate the diester product. Where the two-stage cooling-filtration procedure is used (Figure II) a part of the distillation—hence cooling—may be effected prior to removal of the terephthalic acid. The aqueous alcohol solution removed by the distillation can be processed by known methods to recover the alcohol, if desired.

The diester product is conveniently freed of mother liquor by washing the product with a part, or all, of the feed alcohol.

The process of the invention is further illustrated by the following examples:

EXAMPLE I

Three successive esterification tests were carried out. In each test 80 grams of terephthalic acid were esterified with methanol at a temperature of 200° C. and pressure of 40 atmospheres absolute for 5 hours. The only variable was the amount of methanol used to esterify the acid. The following table sets out the alcohol to acid ratios and the composition of the final product obtained:

Table I

| Mole ratio of methanol:terephthalic acid | Composition of the reaction mixture in mole percent | | |
|---|---|---|---|
| | Unconverted terephthalic acid | Monoester | Diester |
| 20:1 | 1 | 22 | 77 |
| 29:1 | 0 | 7 | 93 |
| 40:1 | 0 | 4.5 | 95.5 |

EXAMPLE II

In order to examine the effect of the reaction temperature, terephthalic acid was esterified in a similar manner to that described in Example I, the alcohol being methanol, the reaction period 1 hour and the molecular ratio of methanol to terephthalic acid 40:1, using various reaction temperatures.

The results are shown in the following table.

Table II

| Reaction temperature in °C. | Pressure in atmospheres absolute | Composition of the reaction mixture in mole percent | | |
|---|---|---|---|---|
| | | Unconverted terephthalic acid | Monoester | Diester |
| 200 | ca. 40 | 33 | 49 | 18 |
| 225 | ca. 60 | 4 | 32 | 64 |
| 250 | ca. 90 | 0 | 5.5 | 94.5 |

EXAMPLE III

Seven successive esterification tests were carried out, in each of which 83 grams terephthalic acid were reacted with 640 grams of methanol containing 0.4% by weight of water in a horizontal rotating autoclave of stainless steel at 200° C. and a pressure of approximately 40 atmospheres absolute.

The heating time was approximately ½ hour for each test, heating being continued at 200° C. for ½, 1, 2, 3, 4, 5 and 8 hours, respectively. Afterwards the autoclave was quickly cooled (within ½ hour) to room temperature by blowing air against it.

At the end of each test the quantities of unconverted terephthalic acid and mono- and di-ester formed which were present in the reaction mixture were determined. The results are given below in tabular form:

Table III

| Hours of heating at 200° C. | Composition of the reaction mixture in mole percent | | |
|---|---|---|---|
| | Unconverted terephthalic acid | Monoester | Diester |
| ½ | 57 | 37 | 6 |
| 1 | 33 | 49 | 18 |
| 2 | 9 | 46 | 45 |
| 3 | 5 | 33 | 62 |
| 4 | 0 | 8 | 92 |
| 5 | 0 | 4.5 | 95.5 |
| 8 | 0 | 4.6 | 95.4 |

EXAMPLE IV

To determine the effect upon the desired reaction of water in the reaction mixture, the following series of experiments were performed:

83.4 grams of technical terephthalic acid with a titration equivalent of 83.4 were heated for 3 hours at 225° C. with 640 grams of substantially anhydrous methanol (water content approximately 0.1% by weight) in a rotating autoclave having a capacity of 2 litres. At the end of the conversion the reaction mixture was cooled to 0° C. and the crude diester obtained was sucked off and washed with as much methanol as was theoretically necessary for the esterification of another 83.4 grams of terephthalic acid. This second portion of terephthalic acid was added to the mother liquor thus obtained and this mixture was treated in the same way as in the esterification just described. These operations were continued until six cycles had been completed. The results are listed in the following table:

Table IV

| Cycle No. | Crude ester sucked off, washed and dried, in grams | Composition of reaction product in percent by weight | | | Water in mother liquor after conversion in percent by weight | The product sucked off therefore contained | | Yield of diester present in product sucked off, calculated on TPA[2] added per cycle in mole percent |
|---|---|---|---|---|---|---|---|---|
| | | Monoester | Diester | TPA[1] | | Monoester in grams | Diester in grams | |
| 1 | 89.9 | 2.5 | 97.5 | 0 | 2.5 | 2.1 | 87.8 | 90.5 |
| 2 | 91.5 | 2.1 | 97.9 | 0 | 4.8 | 2.0 | 89.5 | 92.3 |
| 3 | 91.1 | 3.4 | 96.6 | 0 | 7.0 | 3.1 | 88.0 | 90.7 |
| 4 | 92.5 | 3.0 | 97.0 | 0 | 8.8 | 2.8 | 89.7 | 92.5 |
| 5 | 93.7 | 4.6 | 95.4 | 0 | 10.4 | 4.3 | 89.4 | 92.2 |
| 6 | 96.5 | 9.0 | 91.0 | 0 | 13.6 | 8.7 | 87.8 | 90.5 |
| Total | 555.2 | | | | | 23.0 | 532.2 | |

[1] Unconverted terephthalic acid.
[2] Terephthalic acid.

Thus, after six cycles a quantity of sucked off product was obtained from 3 moles of terephthalic acid, containing $$\frac{532.2}{194} = 2.74 \text{ moles of diester}$$

and $$\frac{23}{180} = 0.13 \text{ mole of monoester}$$

Consequently, the yield of diester and monoester in the product sucked off, calculated on the total consumption of terephthalic acid, amounted to $$\frac{2.74}{3} \times 100 = 91 \text{ mole percent}$$

and $$\frac{0.13}{3} \times 100 = 4 \text{ mole percent}$$

respectively.

In order to determine more closely the permissible water content, another series of tests was conducted, in which the exact ratio between the quantities of methanol and water was known. The same rotating autoclave as before was used in these tests. The reaction temperature was invariably 200° C., the mole ratio methanol to terephthalic acid being invariably 40:1. If no water had been added, it was found that after a reaction time of 5 hours, during which the reaction conditions were maintained, no further change occurred in the composition of the reaction product, and that the terephthalic acid was completely converted into a mixture of mono- and dimethly ester. The results are listed in the following table:

Table V

| Water in methanol-water mixture | | Composition of reaction product in mole percent | | |
|---|---|---|---|---|
| Percent weight | Mole, Percent | Terephthalic acid | Mono-ester | Diester |
| 0.0 | 0.0 | 0.0 | 4.7 | 95.3 |
| 5.3 | 9.1 | 0.3 | 12.7 | 87.0 |
| 7.8 | 13.0 | 0.6 | 15.3 | 84.1 |
| 10.1 | 16.7 | 1.0 | 18.2 | 80.8 |
| 22.0 | 33.3 | 2.0 | 30.5 | 67.5 |

EXAMPLE V

That the use of the process of the invention in a cyclic manner is feasible is shown by the results of the following experiments.

Six consecutive esterification experiments were performed, the methanol phase from the previous test being introduced into the subsequent test. The esterification was carried out in a 25 litre stainless steel autoclave. Methanol and terephthalic acid were charged in a molar ratio of 40 to 1. Reaction temperature: 225° C. Reaction pressure: 73 atmospheres absolute. Reaction time: 3 hours. Water content was maintained at a maximum of 10% by weight of the reaction mixture by flashing sufficient of the reaction mixture to remove the necessary amount of water; the flashing was effected immediately after the reaction was halted. Crude dimethyl terephthalate was obtained by cooling the flasher bottoms to about 65° C. or less and filtering the mixture.

The following results were obtained:

1. Esterification of the terephthalic acid was 99.5% or greater.
2. The yield of dimethyl terephtalate was 95–96 mole percent.
3. The quality of the product from the 1st and 6th experiments was about the same, indicating that for the six cycles there was no harmful build-up of impurities in the methanol phase.

We claim as our invention:

1. A process for the preparation of dialkyl esters of terephthalic acid, said process comprising heating a mixture of a liquid lower monohydric alkanol and terephthalic acid, in the molar ratio of from about 25 to 1 to about 50 to 1, at a temperature of from about 150° C. to about 300° C., at superatmospheric pressure and in the absence of any catalyst.

2. The process of claim 1 wherein the alkanol is methanol.

3. A cyclic process for the preparation of dialkyl esters of terephthalic acid, said process comprising heating in a reaction zone, a mixture of a liquid lower monohydric alkanol and terephthalic acid in the molar ratio of from about 25 to 1 to about 50 to 1, at a temperature of from about 150° C. to about 300° C., at superatmospheric pressure and in the absence of any catalyst, removing the resulting reaction mixture from the said reaction zone, separating a diester of terephthalic acid and said alkanol from the said reaction mixture and recycling the diester-free reaction mixture, together with fresh alkanol and acid to the said reaction zone.

4. The process of claim 3 wherein the water content of the reaction mixture is maintained within the range of from 0% by weight to about 30% by weight.

5. A continuous process for the production of dialkyl esters of terephthalic acid, said process comprising continuously adding a lower monohydric alkanol and terephthalic acid to a reaction zone in such proportions that the molar ratio of said alkanol and said acid in the reaction zone is from about 25 to 1 to about 50 to 1, heating the resulting mixture to a temperature of from about 150° C. to about 300° C., the pressure being such that the alkanol is maintained in the liquid phase, no catalyst being added, continuously removing the reaction mixture from said reaction zone, continuously removing sufficient alcohol and water to maintain the water content of the reaction mixture removed from said reaction zone within the range of from 0% to about 30% by weight, continuously removing a diester of terephthalic acid and said alkanol from said reaction mixture, and continuously recycling the diester-free reaction mixture to said reaction zone.

6. A continuous process for the production of dialkyl esters of terephthalic acid, said process comprising continuously adding a lower monohydric alkanol and terephthalic acid to a reaction zone in such proportions that the molar ratio of said alkanol and said acid in the reaction zine is from about 25 to 1 to about 50 to 1, heating the resulting mixture to a temperature of from about 150° C. to about 300° C., the pressure being such that the alkanol is maintained in the liquid phase, no catalyst being added, continuously removing the reaction mixture from said reaction zone, continuously removing sufficient alcohol and water to maintain the water content of the reaction mixture removed from said reaction zone within the range of from 0% to about 30% by weight, and cooling the reaction mixture until a diester of terephthalic acid and said alkanol precipitates substantially quantitatively, continuously removing the said solid diester from the said reaction mixture, continuously washing the said solid diester with at least a part of the said lower alkanol charged to the reactor, and continuously recycling the diester-free reaction mixture, and the lower alkanol used to wash said solid diester to said reaction zone.

7. The process of claim 6 wherein removal of the solid diester from the reaction mixture is effected by filtration.

References Cited in the file of this patent

UNITED STATES PATENTS

| 2,465,319 | Whinfield et al. | Mar. 22, 1949 |
| 2,479,066 | Gresham | Aug. 16, 1949 |